(12) United States Patent
Ohno et al.

(10) Patent No.: US 9,151,642 B2
(45) Date of Patent: Oct. 6, 2015

(54) MEASURING INSTRUMENT

(71) Applicant: MITUTOYO CORPORATION, Kawasaki-shi, Kanagawa (JP)

(72) Inventors: Teppei Ohno, Nakatsugawa (JP); Kazuo Asahi, Nakatsugawa (JP); Munenori Ishii, Nakatsugawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 436 days.

(21) Appl. No.: 13/666,519

(22) Filed: Nov. 1, 2012

(65) Prior Publication Data

US 2013/0118279 A1  May 16, 2013

(30) Foreign Application Priority Data

Nov. 10, 2011   (JP) ................. 2011-246629

(51) Int. Cl.
*G01D 13/10* (2006.01)
*G01D 7/00* (2006.01)
*G01D 13/20* (2006.01)

(52) U.S. Cl.
CPC ............... *G01D 7/002* (2013.01); *G01D 13/20* (2013.01)

(58) Field of Classification Search
None
See application file for complete search history.

(56) References Cited

U.S. PATENT DOCUMENTS

| 4,748,404 A | 5/1988 | Heinze et al. |
| 5,280,567 A | 1/1994 | Kobayashi |
| 7,940,604 B2 * | 5/2011 | Inoue et al. ............ 368/80 |
| 2009/0113734 A1 | 5/2009 | Matsumiya et al. |
| 2010/0283592 A1 | 11/2010 | Boutin |

FOREIGN PATENT DOCUMENTS

| GB | 2 312 510 A | 10/1997 |
| JP | S58-19503 A | 2/1983 |
| JP | S60-205314 A | 10/1985 |
| JP | H10-142001 A | 5/1998 |
| JP | 2002-303539 A | 10/2002 |
| JP | A-2002-310601 | 10/2002 |
| JP | 2002-357459 A | 12/2002 |

(Continued)

OTHER PUBLICATIONS

Feb. 6, 2013 Search Report issued in European Patent Application No. EP 12 00 7600.

(Continued)

*Primary Examiner* — Robert R Raevis
(74) *Attorney, Agent, or Firm* — Oliff PLC

(57) ABSTRACT

A measuring instrument includes a display on which measurements are displayed. The display is provided by an organic electroluminescent panel or an electronic paper including an assembly of organic electroluminescence devices and includes: a display controlling section that displays a plurality of scale segment images at an equal interval and a pointer image at a position corresponding to the measurements among display areas displayed by the plurality of scale segment images; and a scale information input section that specifies at least one of the display areas and inputs scale interval information of the scale segment images on the specified area. The display controlling section includes a scale interval changing section that, based on the scale interval information, displays the scale segment images on the specified area commanded by the scale information input section.

8 Claims, 7 Drawing Sheets

(56) References Cited

FOREIGN PATENT DOCUMENTS

| JP | 2004-333598 A | 11/2004 |
| JP | 2009-115552 A | 5/2009 |

OTHER PUBLICATIONS

Jul. 7, 2015 Office Action issued in Japanese Application No, 2011-246629.

* cited by examiner

MEASURING INSTRUMENT

The entire disclosure of Japanese Patent Applications No. 2011-246629 filed Nov. 10, 2011 is expressly incorporated by reference herein.

BACKGROUND OF THE INVENTION

1. Field of the Invention

The present invention relates to a measuring instrument. More specifically, the present invention relates to a measuring instrument including a display on which measurements are displayed.

2. Description of Related Art

A dial gauge is known as a measuring instrument for reading dimensions and the like of an object to be measured using a pointer and scales (see, for instance, Patent Literature 1: JP-A-2002-310601).

The dial gauge includes a spindle axially movable in a main body case and is configured to convert a displacement amount of the spindle to a rotary movement of the pointer via a magnification mechanism. The dimensions and the like of the object is measured by reading a rotation angle of the pointer from scales of a scale plate.

The scales are printed on an outer periphery of the scale plate at a predetermined interval. The scale interval is one factor for showing usability of the dial gauge. With a wide scale interval, the scales are easily read, whereas a stroke of the spindle per rotation of the pointer becomes short since the number of divisions in one round of the scale plate becomes small, thereby narrowing a measurement range. On the other hand, with a narrow scale interval, the measurement range can be enlarged since the stroke of the spindle becomes long per rotation of the pointer, whereas the scales are difficult to read.

Accordingly, in a typical dial gauge, an optimum scale interval is set in consideration of readability while ensuring a certain measurement range and is set entirely over the measurement range.

Since the optimum scale interval is set entirely over the measurement range in consideration of readability while ensuring a certain measurement range in a measuring instrument for reading dimensions of an object using the pointer and the scales as described above, disadvantages may occasionally occur.

For instance, for measuring a large variety of dimensions of a plurality of components, the measurement is possible since a relatively wide measurement range can be ensured. However, when the components have a small variety of dimensions and it is required to check whether or not the measurement value falls within a preset dimensional tolerance against the reference value, the scales are occasionally difficult to read within the range of the dimensional tolerance since the scale interval is set at an equal interval entirely over the measurement range.

SUMMARY OF THE INVENTION

An object of the invention is to provide a measuring instrument having easily readable scales on a specified area while displaying a relatively wide measurement range, in other words, to provide a measuring instrument capable of simultaneously ensuring favorable measurement range and readability of the scales, as compared with a typical measuring instrument.

A measuring instrument according to an aspect of the invention includes a display on which measurements are displayed, in which the display is provided by an organic eleetroluminescent panel or an electronic paper comprising an assembly of organic electroluminescence devices, the display includes: a display controlling section that displays a plurality of scale segment images at an equal interval and a pointer image at a position corresponding to the measurements among display areas displayed by the plurality of scale segment images; and a scale information input section that specifies at least one of the display areas and inputs scale interval information of the scale segment images on the specified area, and the display controlling section includes a scale interval changing section that, based on the scale interval information, displays the scale segment images on the specified area commanded by the scale information input section.

Herein, the organic electroluminescent panel refers to an assembly of organic electroluminescent (Electra-Luminescence) devices. Particularly, the organic electroluminescent panel is preferably a dot-matrix type in which the organic electroluminescent devices are arranged in a matrix. The electronic paper refers to an electrophoretic display panel.

The measuring instrument refers to a measuring instrument for measuring a physical quantity such as a length, distance and angle (e.g. a vernier caliper, micrometer and indicator (dial gauge)).

According to the above arrangement, since the display is provided by the organic electroluminescent panel or the electronic paper, display contents are easily changeable. The display includes the display controlling section and the scale information input section. Since the display controlling section includes the scale interval changing section to display the scale segment images, in which an interval is based on the scale interval information, on the area specified by the scale information input section, the interval in the scale segment images on the specified area is changeable to an interval based on the scale interval information inputted by the scale information inputting section.

Accordingly, since the interval in the scale segment images on the specified area is changeable to any interval while a relatively wide measurement area is displayed, the measurement range and readability of the scale can be simultaneously ensured.

Since the display is provided by the organic electroluminescent panel or the electronic paper, visibility is improvable and production costs are reducible. For instance, since the organic electroluminescent display device has a wide view angle (nearly 180 degrees) and is self-luminous, improvement in visibility can be expected. Further, since the display contents on the display can be easily changed, the display can be used in common with a plurality of types of measuring instruments. In addition, since the display design can be easily changed, the production cost can be reduced.

In the measuring instrument according to the above aspect of the invention, it is preferable that the scale information input section inputs a dimensional tolerance to a reference value to define the specified area, and, with the proviso that a range of the dimensional tolerance to the reference value is defined as the specified area, the scale interval changing section displays on the specified area the scale segment images in which an interval is based on the scale interval information.

With this arrangement, when the scale information input section inputs the dimensional tolerance to the reference value and the scale interval information, the scale interval changing section displays the scale segment images on a specified area (i.e., a range of the dimensional tolerance to the reference value) at an interval based on the inputted scale interval information. Accordingly, it can be easily checked whether or not the measurements fall within the dimensional tolerance.

The measuring instrument according to the above aspect of the invention preferably further includes a judgment section that judges whether or not the measurements fall within the dimensional tolerance to the reference value, in which the display controlling section displays a judgment image judged by the judgment section on the display.

With this arrangement, since the display controlling section displays the judgment image judged by the judgment section on the display after the judgment section judges whether or not the measurements fall within the dimensional tolerance to the reference value, it can be understood from the display contents displayed on the display whether the measurements are favorable or not.

In the measuring instrument according to the above aspect of the invention, it is preferable that the display controlling section displays on the display the reference value, the dimensional tolerance, the measurements, a difference between the reference value and the measurements and a GO/NG judgment.

With this arrangement, since the reference value, the dimensional tolerance, the measurements and the difference between the reference value and the measurements are displayed, the respective numerical information can be accurately checked from the display contents displayed on the display.

In the measuring instrument according to the above aspect of the invention, it is preferable that the display controlling section includes an afterimage displaying section that displays an afterimage of the pointer in accordance with a change in motion of the pointer image.

With this arrangement, when the pointer image is moved, the afterimage of the pointer image is displayed in accordance with change in motion, so that the motion of the pointer, in other words, a changing direction and a rough position of the measurements can be recognized from the afterimage of the pointer.

DESCRIPTION OF EMBODIMENT(S)

Arrangement of Measuring Instrument

Figure 1:
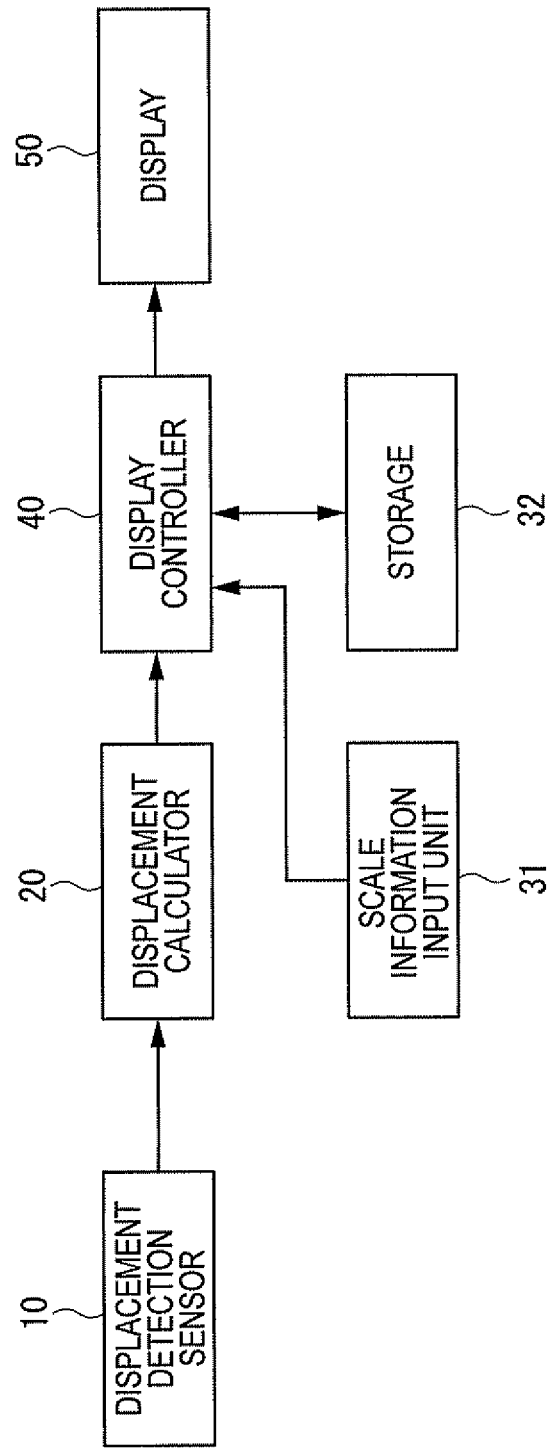
FIG. 1 is a block diagram showing a measuring instrument according to an exemplary embodiment of the invention.

FIG. 1 illustrates a measuring instrument according to an exemplary embodiment.

The measuring instrument includes a displacement detection sensor 10, a displacement calculator 20, a scale information input unit 31 (i.e., a scale information input section), a storage 32, a display controller 40 for controlling a display, and a display 50.

Herein, the measuring instrument refers to a measuring instrument including a movable member that is movable relative to a body and measuring a dimension of an object to be measured based on a displacement of the movable member (e.g. a vernier caliper, micrometer and indicator (dial gauge)).

The displacement detection sensor 10 detects a displacement of the movable member of the measuring instrument. For instance, a vernier caliper detects a displacement of a slider (i.e., movable member) relative to a main scale (i.e., main body). In a micrometer, a micrometer detects a displacement of a spindle (i.e., movable member) relative to the main body. An indicator (dial gauge) detects a displacement of a spindle (i.e., movable member) relative to the main body.

These displacement detection sensors 10 can be provided by, for instance in a vernier caliper, an electrostatic encoder including a main scale provided in a longitudinal direction of the main scale 1 at a predetermined interval and a detector head provided on the slider opposite to the main scale.

The displacement calculator 20 arithmetically processes signals from the displacement detection sensor 10 to calculate the displacement of the movable member of the measuring instrument. The calculated results are provided to the display controller 40.

The scale information input unit 31 inputs data for specifying at least one of display areas displayed on the display 50 and scale interval information for specifying an interval in scale segment images on the above-specified area. Specifically, while inputting a reference value (i.e., a finish size by design) and a dimensional tolerance relative to the reference value for defining the specified area, the scale information input unit 31 inputs scale interval information of the scales within the dimensional tolerance (i.e., the specified area) and the like.

The storage 32 stores image data to be displayed on the display 50 as well as a program for controlling an operation of the display controller 40.

Examples of the stored image data include: scale segment image data for displaying a plurality of scale segment images in a circle and at an equal interval; numerical image data for expressing numerical information in accordance with the scale segment image data at a predetermined position; and pointer image data. In addition to the area for storing the image data, the storage 32 includes: a measurement storage area for storing measurements obtained by the displacement calculator 20 calculating a displacement detected by the displacement detection sensor 10; and a reference value storage area, a dimensional tolerance storage area and a scale interval information storage area respectively for storing the reference value, the dimensional tolerance and the scale interval information inputted by the scale information input unit 31. The storage 32 further includes a difference storage area for storing a difference between the measurements and the reference value, a GO/NG judgment storage area for storing a GO/NG judgment obtained by judging whether or not the difference falls within the dimensional tolerance, and the like.

The display controller 40 displays an image on the display 50 based on the image data stored in the storage 32. Further, the display controller 40 displays the measurements calculated by the displacement calculator 20 as an image on the display 50.

Specifically, the display controller 40 displays the plurality of the scale segment images at the equal interval and a pointer image at a position corresponding to the measurements among the display areas of the scale segment images. The display controller 40 also serves as a scale interval changing section that displays the scale segment images on the area specified by the scale information input unit 31 at an interval based on the scale interval information, a judgment section that judges whether or not the measurements fall within the dimensional tolerance, and an afterimage displaying section that display the afterimages of the pointer in accordance with change in motion of the pointer image.

Figure 2:
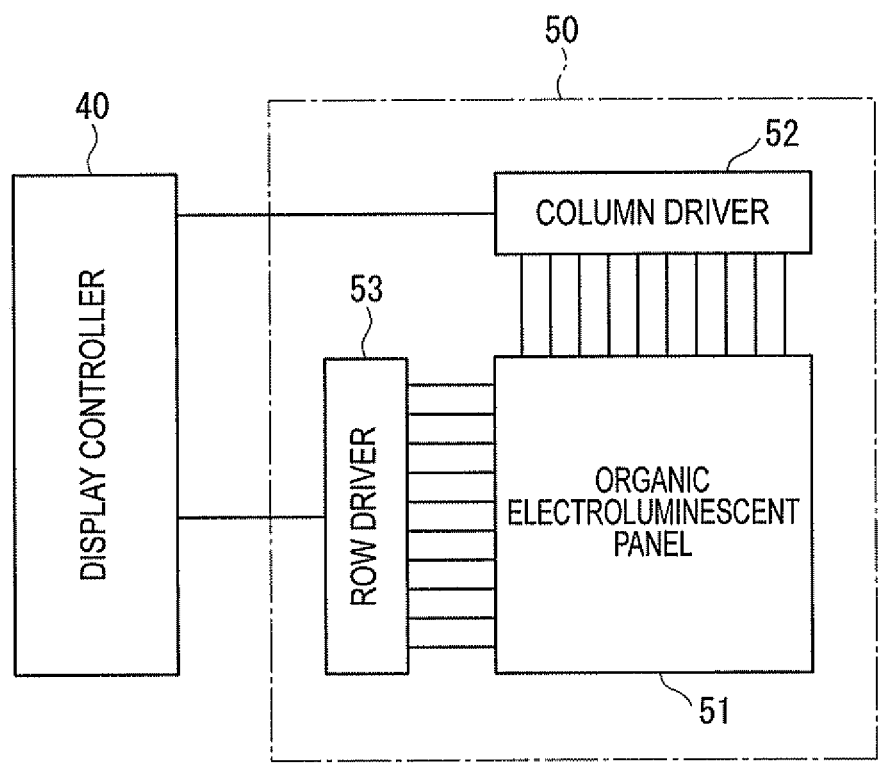
FIG. 2 is a block diagram showing a display controller and a display according to the exemplary embodiment.

As shown in FIG. 2, the display 50 is provided by an organic electroluminescent (Electro-Luminescence) display device.

The organic electroluminescent display device includes an organic electroluminescent panel 51, a column driver 52 and a row driver 53. The organic electroluminescent panel 51 is designed to provide, for instance, a black-and-white screen, in which organic electroluminescence devices (i.e., pixels) are respectively disposed at intersections of a plurality of signal lines and scan lines arranged in a matrix. When the column driver 52 applies voltage to the signal line(s) and the row driver 53 simultaneously applies voltage to the scan line(s), the organic electroluminescence device(s) disposed at the intersection emits light. The image information is displayed in two colors (i.e. black and white), where the emitting portion is shown in white while non-emitting portion is shown in black. In other words, the display controller 40 displays characters and figures on the organic electroluminescent panel 51 based on the image data.

Incidentally, the above drive method of organic electroluminescent panel is referred to as "simple matrix method" or "passive matrix method." It should be noted that the organic electroluminescent panel is not limited to a dot-matrix organic electroluminescent panel. Any type of organic electroluminescent panel may be used, on which a color image may be displayed instead of a black-and-white image.

Incidentally, the above drive method of organic electroluminescent panel is referred to as "simple matrix method" or "passive matrix method." It should be noted that the organic electroluminescent panel is not limited to a dot-matrix organic electroluminescent panel. Any type of organic electroluminescent panel may be used, on which a color image may be displayed instead of a black-and-white image.

Displaying Measurements

When the movable member moves relative to the body, the displacement of the movable member relative to the body is detected by the displacement detection sensor 10 as electric signals that are then sent to the displacement calculator 20. The displacement calculator 20 calculates the displacement of the movable member relative to the body based on the detection signals from the displacement detection sensor 10 and sends the results to the display controller 40.

The display controller 40 displays an image on the display 50 based on the image data stored in the storage 32. Further, the display controller 40 displays the measurements calculated by the displacement calculator 20 as an image on the display 50.

At this time, when the reference value, the dimensional tolerance to the reference value and the scale interval information within the area of the dimensional tolerance are inputted through the scale information input unit 31 before starting a measurement, the reference value, the dimensional tolerance and the scale interval information are stored in respective storage areas of the storage 32, and, further, a difference between the reference value and the measurements and a GO/NG judgment whether the measurements fall within the dimensional tolerance are stored in the respective storage areas of the storage 32.

Subsequently, the scale segment images, the pointer images based on the measurements and the like are displayed on the display 50 by the display controller 40 based on the information stored in the respective storage areas of the storage 32.

Figure 3:
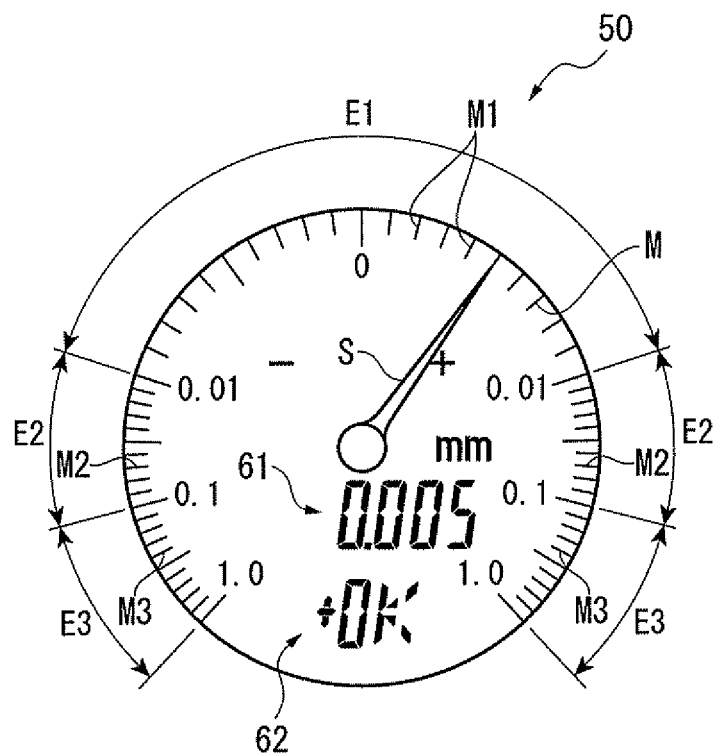
FIG. 3 illustrates a display example of the display according to the exemplary embodiment.

For instance, when the reference value is set at 9.55 mm, the dimensional tolerance is set at +0.01 and −0.01, and the scale interval information is set such that an interval in a range of the dimensional tolerance is n1 times as wide as a typical scale interval and an interval in a range from +0.01 to +0.1 and from −0.01 to −0.1 of the dimensional tolerance is n2 times as wide as a typical scale interval, the images are displayed on the display 50 as shown in FIG. 3.

Specifically, among scale segment images M displayed on the display 50, an interval in a scale segment image M1 within an area E1 in the range (from −0.01 to +0.01) of the dimensional tolerance is displayed at the interval of n1 times as wide as an interval of a typical scale segment image M3 while an interval in a scale segment image M2 within an area E2 in the range (from +0.01 to +0.1 and from −0.01 to −0.1) of the dimensional tolerance is displayed at the interval of n2 times as wide as the interval in the typical scale segment image M3. Moreover, a pointer image S is displayed at a position corresponding to the measurements among the display areas of the scale segment images M. Below the above images, a difference 61 between the reference value and the measurements (9.555 mm) and a GO/NG judgment 62 on whether or not the measurements fall within the dimensional tolerance are displayed.

According to this exemplary embodiment, when the scale information input unit 31 beforehand inputs the data for specifying at least one of the display areas displayed on the display 50 and the scale interval information for specifying the interval in the scale segment images on the specified area, the display controller 40 changes the interval in the scale segment images on the specified area to the interval based on the scale interval information, so that the interval in the scale segment images on the specified area is changeable to any interval while a relatively wide measurement area is displayed. For this reason, the measurement range and readability of the scales can be simultaneously ensured.

Moreover, since the scale information input unit 31 inputs the dimensional tolerance to the reference value as the specified area, the scale segment images defined within the dimensional tolerance can be displayed at the interval based on the inputted scale interval information, so that it can be easily checked whether or not the measurements fall within the dimensional tolerance.

In addition to including the judgment section for judging whether or not the measurements fall within the dimensional tolerance to the reference value, the display controller 40 displays the judgment image judged by the judgment section on the display 50, so that it can be understood from the display contents displayed on the display 50 whether the measurements are favorable or not.

Further, since the display contents on the display 50 can be easily changed, in other words, the display design is easily changeable, the production cost is reducible.

Further, in this exemplary embodiment, since the display 50 is provided by the organic electroluminescent panel 51 including an assembly of organic electroluminescence devices, visibility of the display 50 can be enhanced. Specifically, since the organic electroluminescent panel 51 has a wide view angle (nearly 180 degrees) and is self-luminous, improvement in visibility can be expected.

Further, since the organic electroluminescent panel 51 is a dot-matrix type having the organic electroluminescence devices arranged in a matrix, not only the numerical display of the measurements but also various display designs can be provided.

<Modifications>

It should be understood that the scope of the present invention is not limited to the above-described exemplary embodiments but includes modifications and improvements as long as the modifications and improvements are compatible with the invention.

In the above exemplary embodiment, a display switching unit for switching the display contents on the display 50 may be provided. With a switching operation by the display switching unit, the contents in the storage areas of the storage 32 may be digital-displayed on the display 50.

Figure 4:
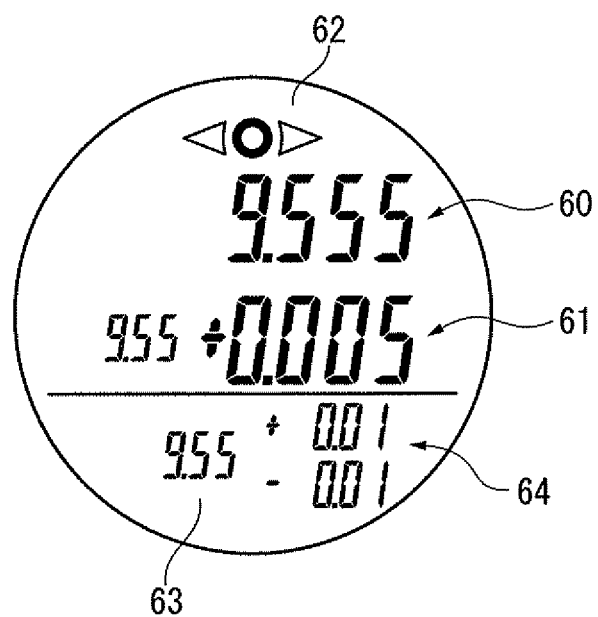
FIG. 4 illustrates another display example of the display according to the exemplary embodiment.

For instance, as shown in FIG. 4, measurements (absolute dimension from the origin) 60, the reference value 63, the dimensional tolerance 64 to the reference value, the difference 61 between the reference value 63 and the measurements, the GO/NG judgment 62 and the like may be displayed on the display 50.

With this arrangement, since the reference value, the dimensional tolerance, the measurements and the difference between the reference value and the measurements are displayed on the display, the respective numerical information can be accurately checked from the display contents displayed on the display.

In the above exemplary embodiment, the display controller 40 may be configured to have an afterimage displaying section that displays an afterimage S' of the pointer in accordance with change in motion of the pointer image S.

Figure 5:
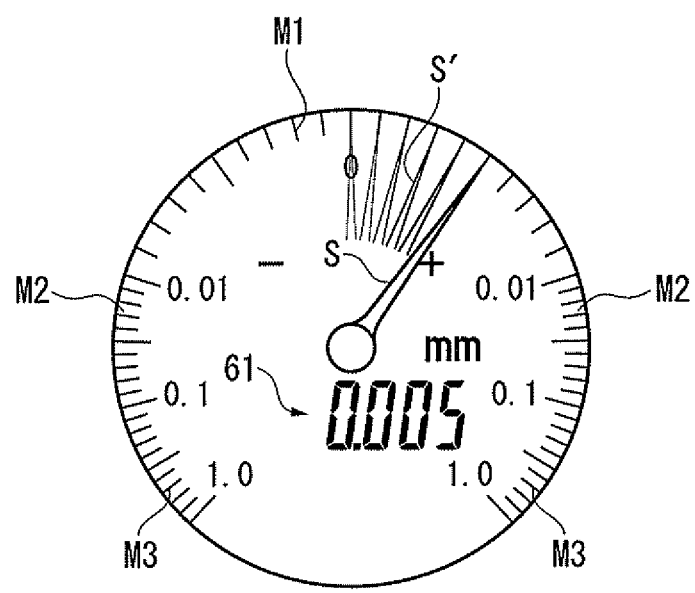
FIG. 5 illustrates still another display example (afterimages of a pointer are shown) of the display according to the exemplary embodiment.

With this arrangement, as shown in FIG. 5, when the pointer image S is moved, the afterimage S' of the pointer image S is displayed in accordance with change in motion, so that the motion of the pointer, in other words, a changing direction and a rough position of the measurements can be understood from the afterimage S' of the pointer image S.

Figure 6:
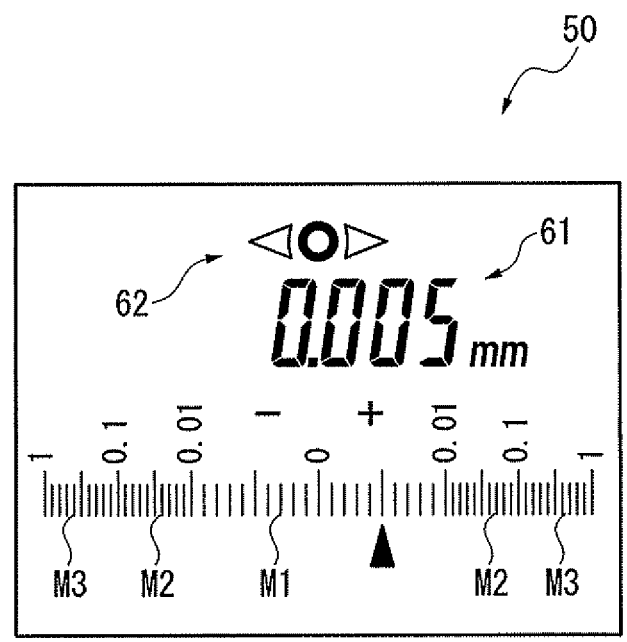
FIG. 6 illustrates a further display example (linearly arranged scales are shown) of the display according to the exemplary embodiment.

In the above exemplary embodiment, the plurality of scale segment images are circularly arranged. However, as shown in FIG. 6, the plurality of scale segment images M1 to M3 may be linearly arranged.

In the above exemplary embodiment, the interval in each of the scale segment images M1 and M2 respectively in the area E1 in the range of the dimensional tolerance to the reference value and the area E2 adjacent to the area E1 are changed. However, it is only required to change at least one of the areas.

Moreover, the area in which the interval in the scale segment images is to be changed may not be limited to the area in the range of the dimensional tolerance, but may be areas out of the range. Alternatively, the interval in the scale segment images on the entire display areas may be changed.

In the above exemplary embodiment, the organic electroluminescent panel 51 is used for the display 50. However, a sufficiently visible and portable display medium of which display contents can be electrically rewritten, such as an electronic paper, specifically an electrophoretic display panel may alternatively be used.

Figure 7:
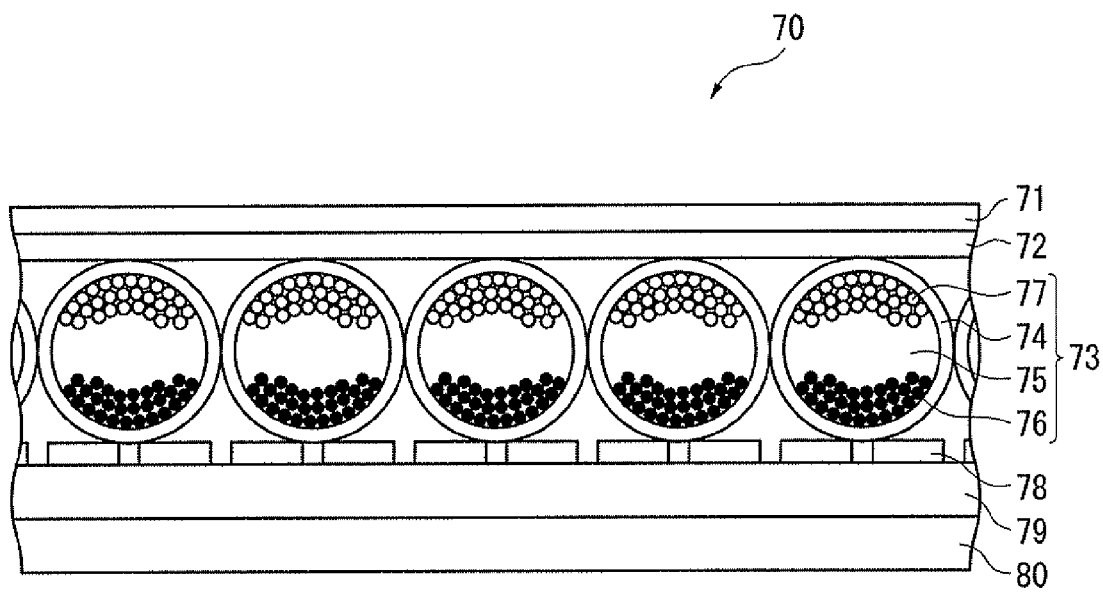
FIG. 7 illustrates still further display example of the display according to the exemplary embodiment.

For instance, as shown in FIG. 7, an electrophoretic display panel 70 includes a sequentially layered arrangement of a front base material 71, a common electrode 72, an electrophoretic layer 73, pixel electrodes 78, a TFT circuit layer 79 and a back base material 80. The front base material 71 and the back base material 80 are provided by a transparent resin sheet. The TFT circuit layer 79 is provided thereon with TFT circuits driven by scan-line driver circuits, specifically switching transistors. Each of the transistors is connected to the pixel electrodes 78 provided for each of the pixels. The common electrode 72 is provided by a transparent electrode material such as ITO (Indium In Oxide) and is provided substantially on the entire area of the electrophoretic display panel 70. The pixel electrodes 78 are provided for each of the pixels of the display panel 70.

The electrophoretic layer 73 includes a plurality of microcapsules 74 bonded to the common electrode. Electrophoretic-particles-dispersion liquid 75 in which a number of electrical-charged particles are dispersed is sealed in the microcapsules 74. Black electrophoretic particles (referred to as "black particles" hereinafter) 76 and white electrophoretic particles (referred to as "white particles" hereinafter) 77 are dispersed in the electrophoretic-particles-dispersion liquid 75 to form an electrophoretic layer of two-color-particles fluid. The black particles 76 and white particles 77 are charged with different polarities. Herein, the black particles 76 are negatively charged while the white particles 77 are positively charged.

The black particles 76 and the white particles 77 in the microcapsules 74 are subjected to electrophoresis by a potential difference generated between the common electrode 72 and the pixel electrodes 78.

Supposing that the pixel electrodes 78 is at a low level and the common electrode 72 is at a high level, an electric field going from the common electrode 72 to the pixel electrodes 78 is generated by the potential difference between the common electrode 72 and the pixel electrodes 78. Then, the positively charged white particles 77 move toward the pixel electrodes 78 and the negatively charged black particles 76 are moved toward the common electrode 72. Thus, the area where the potential of the pixel electrodes 78 is low as compared with the potential of the common electrode 72 is displayed in black when seen from the side of the front base material 71.

In contrast, when the pixel electrodes 78 are switched to a high level and the common electrode 72 is switched to a low level, since the direction of the electric field is reversed, the pixel is displayed in white.

When the electric field is ceased being applied while the pixel is displayed in black or white, the movement of the black particles 76 and the white particles 77 are stopped to keep the displayed colors at that time.

The invention can be applied not only to the vernier caliper, micrometer and indicator described in the exemplary embodiments but also to various measuring instruments such as a caliper gauge and a surface texture measuring machine.

What is claimed is:

1. A measuring instrument comprising;
a display on which measurements are displayed, the display including:
an organic electroluminescent panel having an assembly of organic electroluminescence devices or an electronic paper;
a display controlling section that displays a plurality of scale segment images at equal intervals and a pointer image at a position corresponding to the measurements among display areas displaying the plurality of scale segment images; and
a scale information input section that specifies at least one of the display areas and that inputs scale interval information of for specifying an interval of the scale segment images on the specified display area for each of the specified display areas into the display controlling section,
wherein the display controlling section includes a scale interval setting section that, based on the scale interval information, displays an interval of the scale segment images on the specified display area based on the input from the scale information input section for each of the specified display areas.

2. The measuring instrument according to claim 1, wherein the scale information input section inputs a dimensional tolerance to a reference value to define the specified display area, and within a range of the dimensional tolerance to the reference value defined for the specified display area, the scale interval setting section displays on the specified display area the scale segment images in which the interval is based on the scale interval information.

3. The measuring instrument according to claim 2, wherein the display controlling section includes an afterimage displaying section that displays an afterimage of the pointer in accordance with a change in motion of the pointer image.

4. The measuring instrument according to claim 2, further comprising:

a judgment section that judges whether or not the measurements fall within the dimensional tolerance to the reference value, wherein the display controlling section displays a judgment image judged by the judgment section on the display.

5. The measuring instrument according to claim 4, wherein the display controlling section displays on the display the reference value, the dimensional tolerance, the measurements, a difference between the reference value and the measurements and a GO/NG judgment.

6. The measuring instrument according to claim 5, wherein the display controlling section includes an afterimage displaying section that displays an afterimage of the pointer in accordance with a change in motion of the pointer image.

7. The measuring instrument according to claim 4, wherein the display controlling section includes an afterimage displaying section that displays an afterimage of the pointer in accordance with a change in motion of the pointer image.

8. The measuring instrument according to claim 1, wherein the display controlling section includes an afterimage displaying section that displays an afterimage of the pointer in accordance with a change in motion of the pointer image.

* * * * *